United States Patent
Weaver et al.

(10) Patent No.: US 6,518,682 B2
(45) Date of Patent: Feb. 11, 2003

(54) SYSTEM MONITOR FOR A LINEAR/ROTARY ACTUATOR

(75) Inventors: Randy Weaver, Milford, IA (US); David Huang, Carlsbad, CA (US); Toan Vu, San Diego, CA (US); Michael A. Ferris, Vista, CA (US); Edward A. Neff, Rancho Santa Fe, CA (US)

(73) Assignee: Systems, Machines, Automation Components Corporation, Carlsbad, CA (US)

( * ) Notice: Subject to any disclaimer, the term of this patent is extended or adjusted under 35 U.S.C. 154(b) by 99 days.

(21) Appl. No.: 09/730,377

(22) Filed: Dec. 4, 2000

(65) Prior Publication Data

US 2002/0067081 A1 Jun. 6, 2002

(51) Int. Cl.⁷ ............................................. H02K 41/00
(52) U.S. Cl. .................... 310/12; 318/135; 318/696; 318/685
(58) Field of Search ............................. 310/12, 13, 14; 318/135, 685, 696

(56) References Cited

U.S. PATENT DOCUMENTS

| | | | |
|---|---|---|---|
| 4,484,118 A | 11/1984 | Manabe | 318/561 |
| 4,544,889 A * | 10/1985 | Hendricks et al. | 324/758 |
| 4,759,124 A | 7/1988 | Snyder | 29/834 |
| 4,809,430 A | 3/1989 | Maruyama | 29/834 |
| 4,821,460 A | 4/1989 | Wegmann | 451/26 |
| 4,864,880 A | 9/1989 | Grant | 74/110 |
| 5,055,725 A | 10/1991 | LaSota | 310/14 |
| 5,175,456 A | 12/1992 | Neff | 310/13 |
| 5,315,189 A | 5/1994 | Neff | 310/12 |
| 5,399,983 A | 3/1995 | Nagasawa | 324/758 |
| 5,416,397 A | 5/1995 | Mazzara | 318/696 |
| 5,446,323 A | 8/1995 | Neff | 310/12 |
| 5,773,951 A * | 6/1998 | Markowski et al. | 318/625 |
| 5,834,916 A * | 11/1998 | Shimogama et al. | 318/568.13 |
| 6,016,039 A * | 1/2000 | Neff et al. | 318/115 |
| 6,107,818 A * | 8/2000 | Czamara | 324/765 |

* cited by examiner

Primary Examiner—Nestor Ramirez
Assistant Examiner—Judson H. Jones
(74) Attorney, Agent, or Firm—Nydegger & Associates

(57) ABSTRACT

A system for programming and controlling the movement of a probe of a voice coil actuator along a path includes a control module that is mounted on a voice coil actuator. Specifically, the control module is connected to a clock and to an encoder to selectively establish a plurality of sequential positions for the probe. Each position in this sequence is defined by a location on the path (translation and rotation), and a time at the location. More specifically, the control module includes a key pad for inputting data to identify each position and also, there is a display for providing a visual presentation of the data. In operation the plurality of sequential positions specify a work cycle for the probe and the voice coil actuator uses the input data to perform a series of work cycles.

18 Claims, 3 Drawing Sheets

SYSTEM MONITOR FOR A LINEAR/ROTARY ACTUATOR

FIELD OF THE INVENTION

The present invention pertains generally to systems and methods for programming and controlling the movements of the probe of a voice coil actuator. More specifically, the present invention pertains to systems and methods for manually inputting operational data into a voice coil actuator to program the movement of its probe. The present invention is particularly, but not exclusively, useful for controlling and programming an actuator probe when a specifically timed sequence of different translational and rotational probe positions are required for a work cycle.

BACKGROUND OF THE INVENTION

It is well known that voice coil actuators can be used in a variety of applications to precisely and accurately position a work probe. Furthermore, it is well known that voice coil actuators can be very effective for rapidly moving a work probe between predetermined positions on a path and to, thereafter, control the exertion of very small controlled forces by the probe on a work piece. Succinctly stated, voice coil actuators are becoming widely recognized as effective tools for use in the manufacture, inspection, and repair of various products. For example, such voice coil actuators are disclosed and claimed in U.S. Pat. No. 5,175,456 which issued to Neff et al. for an invention entitled "Workpiece Transporter," and in U.S. Pat. No. 5,685,214 which also issued to Neff et al. for an invention entitled "Actuator for Translational and Rotary Movement," both of which are assigned to the same assignee as the present invention.

In order to enhance the flexibility and overall usefulness of a voice coil actuator, it is desirable that the actuator be capable of performing a variety of specified work cycles. Such a capability will, necessarily, require that the probe of the actuator must somehow be moved. In some instances, perhaps the entire actuator may need to be moved as well. In all applications, however, regardless whether the actuator itself is moved or held stationary, it will always be desirable to control the probe as it is moved along an essentially linear path relative to the actuator.

Control of a voice coil actuator probe requires the ability to accurately position the probe in a predetermined spatial orientation at a specified time. Accuracy in this case involves precision in moving the probe both in translation and in rotation as it transitions from one position to another position. Furthermore, due to the wide variety of tasks that can be accomplished by a VCA, there are virtually limitless possibilities for probe movement that may be considered. With this in mind, it would be very desirable to have the ability to customize a work cycle for the actuator probe that is specifically tailored to the accomplishment of the assigned task.

In light of the above, it is an object of the present invention to provide a system and method for programming and controlling an actuator probe with a customized work cycle. Another object of the present invention is to provide a system and a method for programming and controlling an actuator probe wherein work cycles can be customized to include a plurality of sequentially timed probe positions. Still another object of the present invention is to provide a system and a method for programming and controlling the movement of an actuator probe between various positions on a path, wherein each position is characterized by translational and rotational locations, as well as a specified time at each of these locations. Yet another object of the present invention is to provide a system and a method for programming and controlling the movement of an actuator probe that is easy to implement, simple to execute and comparatively cost effective.

SUMMARY OF THE PREFERRED EMBODIMENTS

In accordance with the present invention, a system for controlling the movement of an actuator probe between predetermined positions on a substantially linear path includes a linear encoder, a rotational encoder, and a clock. More specifically, the encoders are used to respectively determine the translational location ("z") and rotational location ("θ") of the probe on the path.

The clock is then used to determine the time ("$t_a$") at which the probe arrives at these locations, and the time ("$t_d$") at which the probe departs these locations. The system also includes a control module that is connected to the clock, and to each of the encoders. As envisioned for the present invention, the control module will have a key pad for inputting data that identifies the locations ("z" and "θ") and the times ("$t_a$" and "$t_d$") for each position of the probe. Further, data can be input for a plurality of sequential positions so that, collectively, the data will establish a work cycle for the probe. The control module will also have a display for providing visual presentations of this data.

In order to establish a work cycle for the actuator probe, a reference time ($t_0$) is set for the clock, and a base datum (which includes both $z_0$ and $θ_0$) is set for the position of the probe. Next, a first position (i.e. start position) for the work cycle is identified. This is accomplished by using the control module to input a translation location ($z_1$) and a rotation location ($θ_1$) for the probe at the start time ($t_{a1}$). A second position ($z_2$, $θ_2$, $t_{a2}$, $t_{d2}$) can then be sequentially identified for the work cycle.

It is important to note that for a general motion of the probe between the first position and the second position (i.e. one involving both translation and rotation), $z_2$ will change from $z_1$, and $θ_2$ will change from $θ_1$ ($z_2 \neq z_1$, and $θ_2 \neq θ_1$). For a pure translational movement of the probe, however, (i.e. one where there is no rotation) $z_2$ will be different than $z_1$, but $θ_2$ will remain equal to $θ_1$ ($z_2 \neq z_1$ but $θ_2 = θ_1$). On the other hand, for a pure rotation of the probe between the first position and the second position, $z_2$ will be the same as $z_1$ but θ will change ($z_2 = z_1$ and $θ_2 \neq θ_1$). All of these are possible changes from the first position to the second position and, in each case, the transition is accomplished by using the key pad of the control module to input the appropriate data.

Once the second position for the probe is established with an arrival time $t_{a2}$, a third position (established at $t_{a3}$), a fourth position (established at $t_{a4}$), and so on to an $n^{th}$ position (established at $t_{an}$) can be sequentially determined for the probe ($t_{a1,a2,a3 \ldots an}$; $z_{1,2,3 \ldots n}$; $θ_{1,2,3 \ldots n}$; and $t_{d1,d2,d3 \ldots dn}$). Collectively, the sequence of these various positions will then define a work cycle for the probe.

In another aspect for the present invention, it is to be noted that the time duration of both dwell times and transit times for the probe can be programmed into the work cycle by properly selecting input data. Specifically, the dwell time of the probe at a particular position ($t_{dwell}$) will be the difference between $t_a$ and $t_d$ for the position. Similarly, the duration of a transit time for the probe as it moves between sequentially adjacent positions ($t_{transit}$) will be the difference between $t_d$ at the previous position and the $t_a$ at the next immediately subsequent position. Further, it is to be appreciated that by appropriately inputting a $\Delta z$ (e.g. $z_2-z_1$), and a $\Delta\theta$ (e.g. $\theta_2-\theta_1$), together with an appropriate transit time ($t_{transit}$) between the positions, the response speed of the actuator probe can be established. In this case the translational speed will be $\Delta z/t_{transit}$ and the rotational speed will be $\Delta\theta/t_{transit}$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
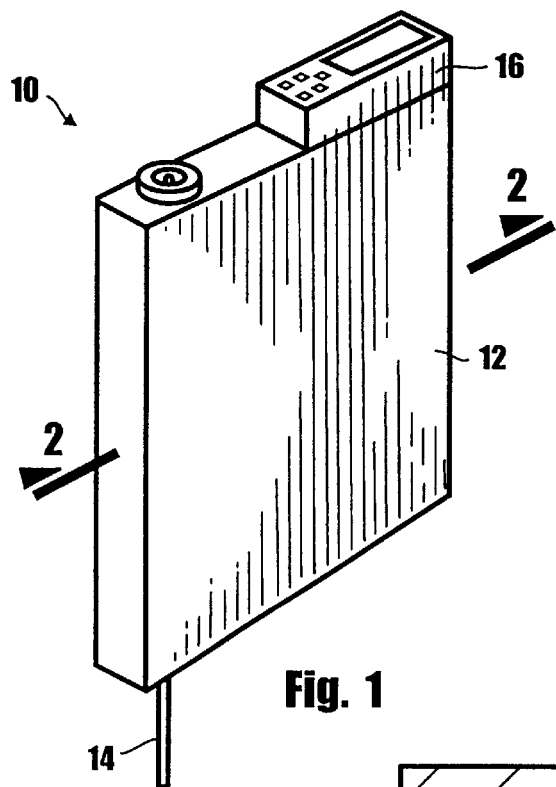
FIG. 1 is a perspective view of a voice coil actuator with a control module in accordance with the present invention.

Referring initially to FIG. 1, a voice coil actuator which is useable for the present invention is shown and is generally designated 10. As shown, the actuator 10 includes a housing 12, and it includes a probe 14 which is mounted on the housing 12 for translational and rotational movement relative thereto. FIG. 1 also shows that the actuator 10 includes a control module 16. For purposes of this disclosure, the control module 16 is shown mounted directly on the housing 12 of the actuator 10. It is possible, however, for the control module 16 to be positioned at a location that is remote from the housing 12.

Figure 2:
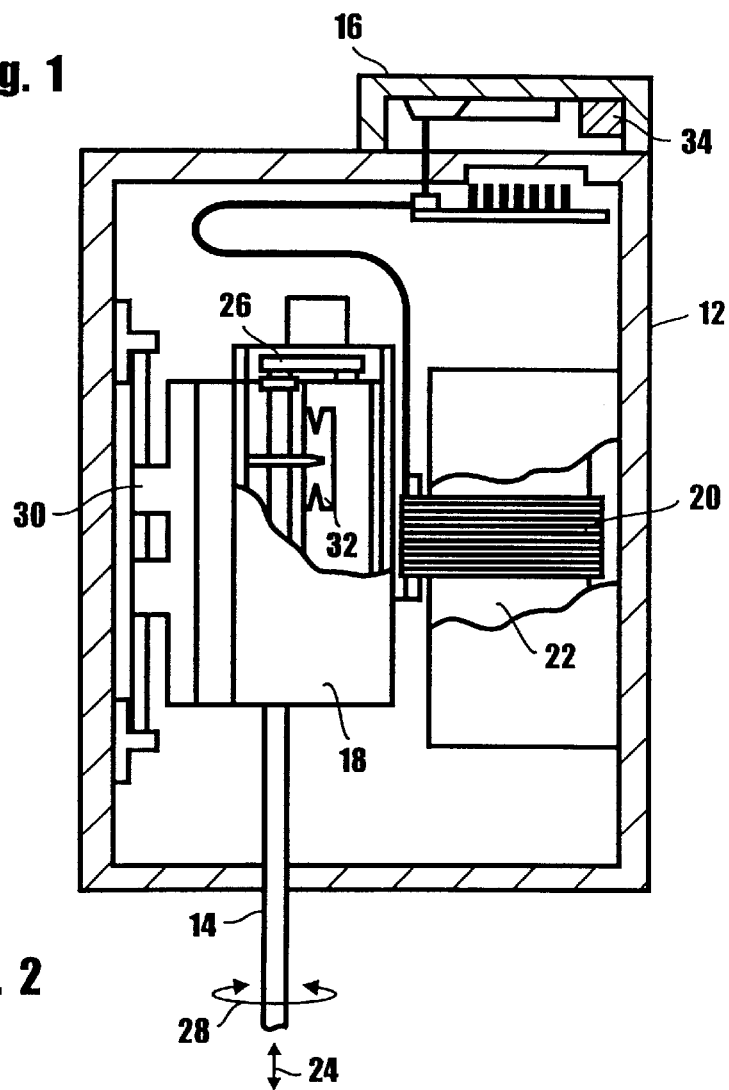
FIG. 2 is a cross sectional view of the actuator as would be seen along the line 2—2 in FIG. 1.

In more detail, FIG. 2 shows that a bobbin 18 is mounted on the housing 12 of the actuator 10, and that an electric coil 20 is attached to the bobbin 18. Further, as intended for the present invention, the coil 20 surrounds a permanent magnet 22. The consequence of this structure is that when an electrical current is passed through the coil 20, the resultant electric field interacts with the magnetic field of the magnet 22 to move the bobbin 18 and probe 14 in translation in the directions of the arrow 24. Specifically, as is well known to the skilled artisan, depending on the direction of the electrical current in the coil 20 the probe 14 can be moved back and forth in directions along its axis. FIG. 2 also shows that a rotary drive 26 can be mounted in the housing 12 (possibly on the bobbin 18) for the purposes of rotating the probe 14 in the directions indicated by the arrow 28. For purposes of this disclosure, translational movements of the probe 14 will be considered as being in a "z" direction (see arrow 24). Also, rotational movements of the probe 14 will be considered as being changes in an angle "$\theta$" (see arrow 28).

In order to determine a position for the probe 14 relative to the housing 12 (i.e. "z" and "$\theta$") the actuator 10 includes a linear encoder 30 for determining "z" for the probe 14 and a rotary encoder 32 for determining "$\theta$" for the probe 14. For the purposes of the present invention, the linear encoder 30 and the rotary encoder 32 can be of any type well known in the pertinent art. It is also shown in FIG. 2 that the actuator 10 includes a clock 34 so that a time "t" can be associated with any particular linear location "z" and any particular angular location "$\theta$". As intended for the present invention, information data including "t", "z" and "$\theta$" are preprogrammed into the actuator 10. This is done using the control module 16.

Figure 3:
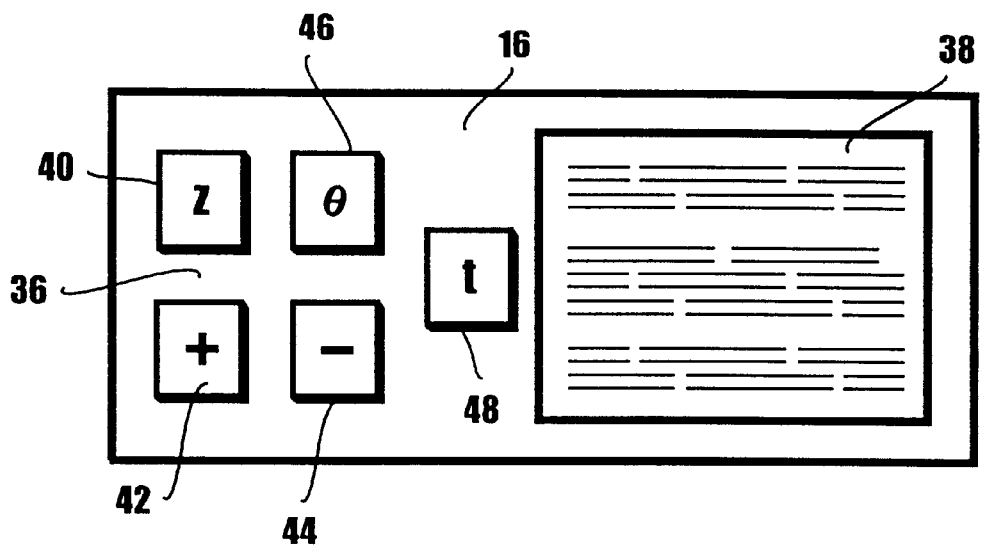
FIG. 3 is a plan view of a control module that is useful for the present invention.

FIG. 3 shows a plan view of an exemplary control module 16 that can be used for the present invention. The exact arrangement of the control module 16 is primarily a matter of design choice and, thus, the particular arrangement shown in FIG. 3 can be modified as desired. Importantly, however, the control module 16 must be effectively useable to program information data including "t", "z" and "$\theta$." As shown in FIG. 3, the control module 16 includes a key pad 36 for inputting data, and it includes a display 38 for providing a visual presentation of the input data. The use of the control module 16 will, perhaps, be best appreciated by cross referencing FIG. 3 with FIG. 4.

As contemplated for the present invention, operation of the actuator 10 requires that the probe 14 be sequentially moved through a series of positions, with each position being identifiable with specific "t", "z" and "$\theta$" input data. Further, it is contemplated by the present invention that an "n" number of positions may need to be programmed for the probe 14. Accordingly, the control module 16 can be set to automatically scroll from position to position, through the "n" positions, in response to prompts from the operator. Collectively, all of the positions make up a work cycle for the probe 14. As will be appreciated by the skilled artisan, the actuator 10 can then be continuously operated to perform a series of consecutive work cycles.

To begin, the control module 16 starts with position "1" at a predetermined translational location "$z_1$" and a predetermined rotational location "$\theta_1$." Specifically, both the predetermined translational location "$z_1$" and the predetermined rotational location "$\theta_1$" will be identified relative to respective base datums on the actuator 10. The data for position "1" (i.e. $z_1$ and $\theta_1$) can be pre-established, or it can be modified. To modify the data for position "1", the operator will access the "z-mode" by pushing button 40 in key pad 36. Then, by appropriately pushing on the buttons 42 and 44, while monitoring the display 38, the operator can precisely establish a translational location for "$z_1$" as desired. Once "$z_1$" has been precisely established, the operator will input this data by pushing on button 46 to access the "$\theta$-mode." The rotational location for "$\theta_1$" can now be input by again pushing buttons 42 and 44. Again, the display 38 is monitored by the operator. As with the "z" data, the "$\theta$" data will be input by moving to another mode, e.g. by pushing the t-mode button 48. Finally, with "$z_1$" and "$\theta_1$" entered as data for position "1", the operator will establish the time at which probe 14 is to move away from position "1." Again, this is done by appropriately activating the buttons 42 and 44 to establish a departure time, $t_{d1}$.

The set-up for position "2" and for subsequent positions "3 . . . n" is similar to the operation described above for position "1" with the addition of establishing an arrival time, $t_a$, at the new position. Specifically, this can be done by depressing button 48, and then using buttons 42 and 44 to enter an appropriate arrival time. The "z" and "$\theta$" data for the new position for probe 14 can then be entered in the same manner as disclosed above for position "1" and the whole process can be repeated as necessary. This is perhaps best appreciated with reference to FIG. 4.

Figure 4:
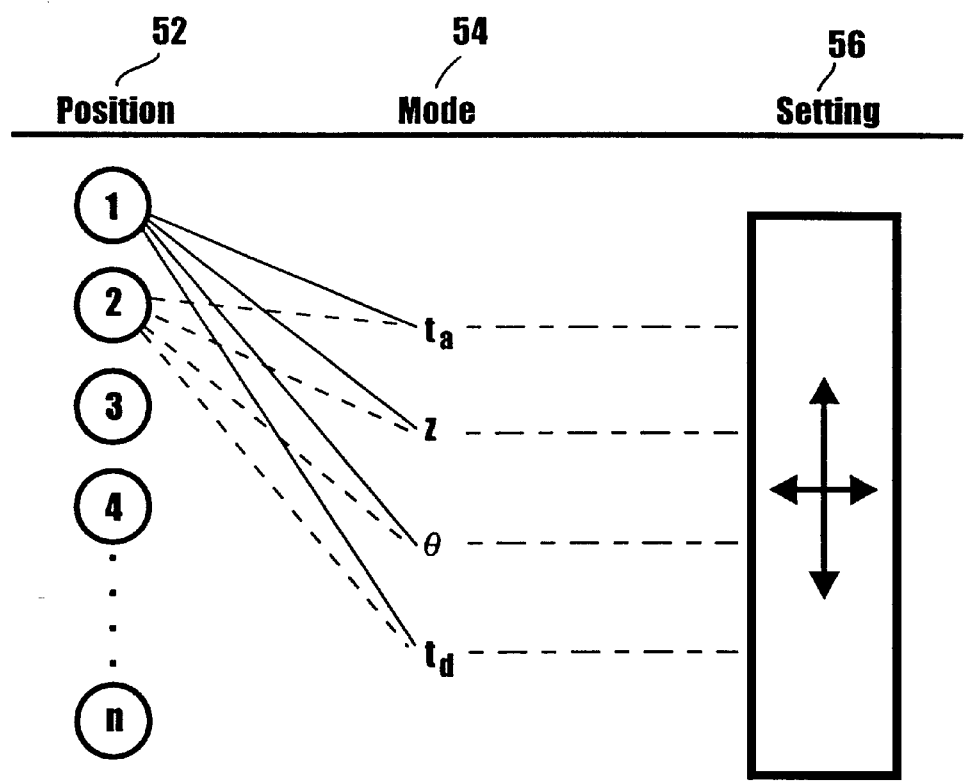
FIG. 4 is a schematic drawing showing the functional relationship between the steps required for inputting a work cycle regimen for the present invention.

When referring to FIG. 4 it is to be appreciated that the control module 16 will be used for inputting data pertinent to an "n" number of positions. Further, for each position there are various modes, and a setting (using buttons 42 and 44) is to be made for each mode. Specifically, the various modes include: an arrival time ($t_a$); a translational location (z); a rotational location (θ); and a departure time ($t_d$). Thus, each position is to be identified by specific data for each of the modes. For example, the data for the "n" position will be ($t_{an}$; $z_n$; $θ_n$; and $t_{dn}$). Further, it is to be appreciated that a dwell time can be established as the time between an arrival and a departure at a position ($t_{dwell}=t_{dn}-t_{an}$). Also, a transit time can be established as the time between a departure from one position and an arrival at the next position ($t_{transit}=t_{an}-t_{d(n-1)}$). With this in mind, it is also possible to establish translational and rotational speeds for the probe 14 by properly using the control module 16 to input changes in "z" and "θ" during a transit time, $t_{transit}$.

Figure 5:
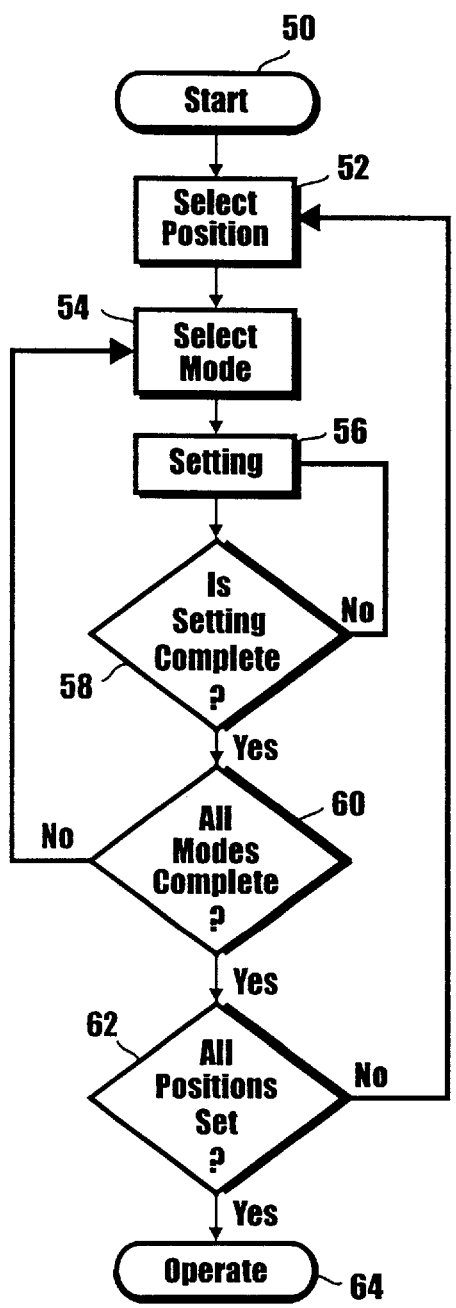
FIG. 5 is a logic flow chart of the functional steps employed by the present invention.

An overview of the set-up procedure for actuator 10 in accordance with the present invention is shown in FIG. 5. There it will be seen that the set-up begins with function block 50. Once the procedure is started, block 52 requires a position be selected for the probe 14. As indicated above this can be accomplished automatically or, alternatively, it can be accomplished manually. In either case, once a position has been selected, the operator selects a mode (action block 54). As shown in FIG. 4, each mode covers a specific aspect of the position of probe 14 ($t_{an}$; $z_n$; $θ_n$; and $t_{dn}$) and the action block 56 shows that a setting is entered for each mode. Once a setting has been entered for a particular mode (decision block 58), and the settings for all modes have been completed (decision block 60), the set-up procedure moves to the next position. This continues until all positions have been entered into the control module 16 (decision block 62). After all of this has been accomplished, the actuator 10 can then be operated (function block 64) to perform a work cycle.

Figure 6:
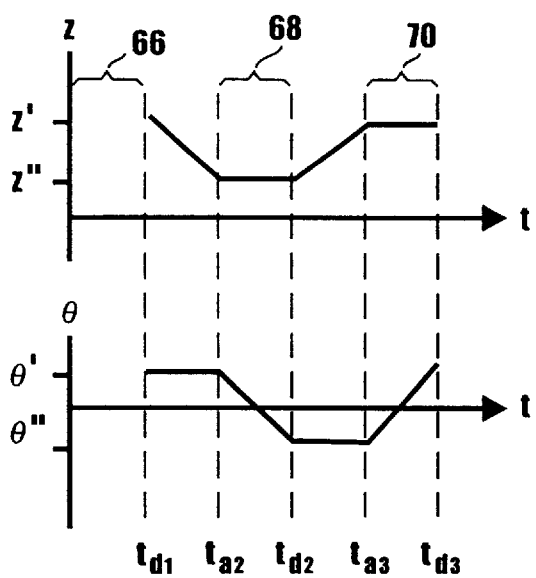
FIG. 6 is a time graph of an exemplary work cycle showing probe location changes in both translation and rotation.

An example of a work cycle for the actuator 10 of the present invention, is presented in FIG. 6. When considering FIG. 6, however, it is to be appreciated that the position of the probe 14 is identified in terms of its translational location "z." Accordingly, the arrival times and departure times associated with a position are also measured relative to the translational location "z." With this in mind, the position 66 shown in FIG. 6 can be considered as being position "1." Thus, it is an "initial" or "start" position. Obviously, there will not be an arrival time for position "1" but there will be a departure time. Thus, the input data for position "1" is ($z_1$, $θ_1$, $t_{d1}$ wherein $z_1$=z' and $θ_1$=θ'). As shown in FIG. 6, the transition from position 66 (position "1") to position 68 (position "2") is made as a pure translational movement (i.e. only a change in "z"). To effect this transition, the operator will input data (e.g. $t_{a2}$, and $z_2$ wherein $z_2$=z"). FIG. 6 also indicates that while at position 68 (i.e. position "2") the probe 14 is rotated while its translational location is held constant. To do this, the operator will need to input data (e.g. $θ_2$, $t_{d2}$ wherein $θ_2$=θ"). FIG. 6 then indicates that the probe 14 will be moved to a position 70 (position "3") by first moving the probe 14 from z' back to z' and then rotating the probe 14 from θ" back to θ'. This can all be accomplished by inputting appropriate data into the actuator 10 by using the control module 16 in the same manner as disclosed above.

While the particular System Monitor for a Linear/Rotary Actuator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A control system for a voice coil actuator which comprises:

a probe mounted on said actuator, said probe being moveable by said actuator along a path;

a clock;

an encoder mounted on said actuator to determine a location for said probe on said path; and a control module mounted on said actuator, with said control module connected to said clock and to said encoder to selectively establish a plurality of sequential positions for said probe, each said position being defined by a location and a time at said location.

2. A control system as recited in claim 1 wherein said control module comprises:

a key pad for inputting data to identify said location and said time for each said position; and a display for providing a visual presentation of said data.

3. A control system as recited in claim 1 wherein said plurality of sequential positions specify a work cycle for said probe and said actuator performs a series of said work cycles.

4. A control system as recited in claim 3 wherein said work cycle has a predetermined time duration and said control module further comprises:

means for establishing a base datum for said location; and means for measuring said time at said location relative to said time duration of said work cycle.

5. A control system as recited in claim 1 wherein said encoder comprises:

a linear encoder for determining a translational location for said position; and a rotary encoder for determining a rotational location for said position.

6. A control system as recited in claim 5 wherein each said position is defined by said translational location, a time at said translational location, said rotational location, and a time at said rotational location.

7. A controller for moving a probe of a voice coil actuator through a plurality of sequential positions in a work cycle for the probe which comprises:

means for establishing a position for said probe, said position being defined by a location on a path and a time at said location;

means for selectively establishing a plurality of sequential positions for said probe with said plurality of sequential positions specifying said work cycle;

means for defining a respective location and a respective time at said location for each of said plurality of sequential positions; and means for moving said probe through said work cycle.

8. A controller as recited in claim 7 further comprising:

an encoder for determining said location for said probe for each said position; and a clock for determining said time at each said location.

9. A controller as recited in claim 8 wherein said encoder comprises:

a linear encoder for determining a translational location for said position; and a rotary encoder for determining a rotational location for said position.

10. A controller as recited in claim 9 wherein each said position is defined by said translational location, a time at said translational location, said rotational location, and a time at said rotational location.

11. A controller as recited in claim 7 wherein said defining means is a control module.

12. A controller as recited in claim 11 wherein said control module comprises:
 a key pad for inputting data to identify said location and said time for each said position; and
 a display for providing a visual presentation of said data.

13. A controller as recited in claim 7 further comprising means for performing a series of said work cycles.

14. A method for programming the movement of a probe of a voice coil actuator through a plurality of sequential positions in a work cycle for the probe which comprises the steps of:
 establishing a position for said probe, said position being defined by a location on a path and a time at said location;
 selectively establishing a plurality of sequential positions for said probe with said plurality of sequential positions specifying said work cycle;
 defining a respective location and a respective time at said location for each of said plurality of sequential positions; and
 moving said probe through said work cycle.

15. A method as recited in claim 14 further comprising the steps of:
 inputting data to identify said location and said time for each said position; and
 a display for providing a visual presentation of said data.

16. A method as recited in claim 14 further comprising the step of performing a series of said work cycles.

17. A method as recited in claim 14 wherein said work cycle has a predetermined time duration and said method further comprises the steps of:
 establishing a base datum for said location; and
 measuring said time at said location relative to said time duration of said work cycle.

18. A method as recited in claim 17 further comprises the steps of:
 determining a translational location for said position; and
 determining a rotational location for said position.

* * * * *

UNITED STATES PATENT AND TRADEMARK OFFICE
CERTIFICATE OF CORRECTION

PATENT NO. : 6,518,682 B2
DATED : February 11, 2003
INVENTOR(S) : Randy Weaver et al.

It is certified that error appears in the above-identified patent and that said Letters Patent is hereby corrected as shown below:

Column 4,
Line 53, delete "$Z_1$" and "$\theta_1$" insert -- $Z_1$ and $\theta_1$ --

Column 5,
Line 58, delete "from z' back to z'" insert -- from z" back to z' --

Signed and Sealed this

Twenty-fourth Day of June, 2003

JAMES E. ROGAN
*Director of the United States Patent and Trademark Office*